United States Patent [19]

Warfield et al.

[11] 4,003,876

[45] Jan. 18, 1977

[54] SUPER COOLED M-PHENYLENE DIAMINE AS A CURING AGENT FOR EPOXY RESINS

[75] Inventors: Robert W. Warfield, Germantown; Thomas J. Wade, Takoma Park; Porter W. Erickson, Silver Spring, all of Md.

[73] Assignee: The United States of America as represented by the Secretary of the Navy, Washington, D.C.

[22] Filed: July 25, 1975

[21] Appl. No.: 599,297

Related U.S. Application Data

[60] Continuation of Ser. No. 668,272, Aug. 7, 1967, abandoned, which is a division of Ser. No. 311,596, Sept. 25, 1963, abandoned.

[52] U.S. Cl. .......................... 260/47 EN; 260/2 N
[51] Int. Cl.² ........................................ C08G 59/50
[58] Field of Search ................... 260/47 EN, 2 N

[56] References Cited

UNITED STATES PATENTS

| | | | |
|---|---|---|---|
| 2,893,973 | 7/1959 | Steckler et al. | 260/47 |
| 2,904,530 | 9/1959 | Steckler et al. | 260/47 |
| 2,938,004 | 5/1960 | DeHoff et al. | 260/2 |
| 2,946,821 | 7/1960 | Schenck et al. | 260/582 |
| 2,950,319 | 8/1960 | Schenck et al. | 260/582 |
| 2,988,535 | 6/1961 | Feuchtbaum et al. | 260/47 |
| 3,068,289 | 12/1962 | Woodbridge | 260/578 |
| 3,312,636 | 4/1967 | Rizzo | 260/2 |

*Primary Examiner*—Harold D. Anderson
*Assistant Examiner*—E. A. Nielsen
*Attorney, Agent, or Firm*—R. S. Sciascia; A. L. Branning

[57] ABSTRACT

A method for combining a curing agent with an epoxide resin which comprises: (a) heating a normally solid non-adulterated aromatic polyamine to a temperature above its melting point, (b) slowly cooling the melted aromatic polyamine to room temperature to form a stable supercooled liquid and (c) mixing the supercooled liquid with the expoxide resin.

4 Claims, No Drawings

SUPER COOLED M-PHENYLENE DIAMINE AS A CURING AGENT FOR EPOXY RESINS

The invention described herein may be manufactured and used by or for the Government of the United States of America for governmental purposes without the payment of any royalties thereon or therefor.

This is a continuation of application Ser. No. 668,272, filed Aug. 7, 1967, now abandoned, which is a division of Ser. No. 311,596, filed Sept. 25, 1963, also abandoned.

BACKGROUND OF THE INVENTION

This invention relates to curing agents for epoxide resins, a method for preparing such curing agents and a method for incorporating the curing agents into and subsequently curing epoxide resins. More specifically, this invention relates to nonadulterated, stable, liquid curing agents, their preparation and use.

In the past, aromatic polyamines have been used as curing or hardening agents for epoxy resins and compositions containing said resins. Since, however, such compounds are normally solid at room temperature, there are several inherent disadvantages attendant to their use as curing agents. For example, it has been the practice, when using an aromatic polyamine as a curing agent, to heat the amine above its melting point and then incorporate it into the resin system. By this method, the resin must also be heated to approximately the same temperature as the curing agent in order to preclude crystallization of the curing agent upon its addition to a cold resin system. Thus, by heating both the curing agent and the resin to a temperature above the melting point of the curing agent a mixture of the curing agent and the resin could be effected. Other methods which have been used in the past to incorporate polyamine curing agents into epoxide resin systems include: (1) dispersing the curing agent in the resin by grinding on a suitable mill, a method which is both costly and time consuming, (2) dissolving the curing agent in a solvent prior to incorporation into the resin, a procedure which necessitates later solvent removal steps or (3) preheating and liquifying the curing agent, a procedure which leads to possible uncontrolled exothermic reactions and extremely short pot life. Moreover, the curing agent when heated has a tendency to volatilize, thus presenting a problem in regard to the maintenance of proper proportions of curing agent and resin and also creating a health hazard.

Many attempts have been made to prepare stable, liquid curing agents of solid aromatic polyamines so that they might be easily incorporated into epoxide resin systems, however such attempts have been generally unsuccessful.

It has recently been proposed that a mixture of an aromatic polyamine, such as m-phenylene diamine, with p,p'-methyldianiline when heated forms a liquid curing agent composition which may be incorporated into an epoxide resin at room temperature and gives a moderately long pot life. Such mixtures, however, are not stable and have a rather high tendency to crystallize.

SUMMARY OF THE INVENTION

It has now been unexpectedly found that polyamines may be super-cooled in the absence of additives and that the resulting liquid is, from a practical standpoint, indefinitely stable and requires no special handling or additives. Thus, by the use of the super-cooled curing agents as set forth in the following examples, the mixing of liquid resin and liquid curing agent may be readily accomplished at room temperature. Moreover, since heating of the curing agent/resin mixture is not required, the pot life of the resin composition is extended greatly. Further, the use of the curing agents of this invention makes far a cleaner, more rapid, simple and safe process for handling curing agents for epoxide resins. The avoidance of heat during the mixing step leads to a more uniform reaction rate and elimination of the usual high exothermic heat of polymerization.

DESCRIPTION OF THE PREFERRED EMBODIMENT

The curing agents of this invention may be used with most types of epoxides such as, for example, the glycidyl polyethers obtained from the reaction of epichlorohydrin with polyhydric phenols or alcohols and the epoxide resin obtained from the reaction of epichlorohydrin with bis(4-hydroxyphenyl) dimethylmethane. Such an epoxide resin may be represented by the following generalized structural formula:

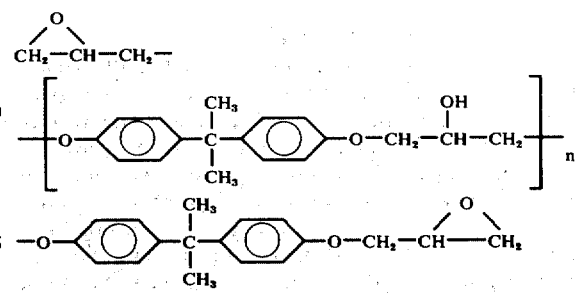

where $n$ is 1 or greater.

The stable, nonadulterated, liquid curing agents of this invention are prepared from normally solid compounds typified by aromatic polyamines such as m-phenylene diamine, 4,4'-methylene dianiline, 2,6-diamino pyridine and diamino diphenyl sulfone.

The method of the invention comprises melting the normally solid compound and allowing it to cool slowly to room temperature. By this method, the normally solid curing agent is converted to a liquid and will remain in that state, practically indefinitely, at room temperature and below. Thus, the need for (1) melting the solid curing agent and heating the resin before incorporation of the curing agent therein, (2) adulterating the curing agent with stabilizers or other compounds which form eutectics therewith or (3) milling the solid resin and solid curing agent together is eliminated. By the method of this invention, the curing agents are converted to stable liquids which may be merely stirred into the resin.

By nonadulterated, it is meant that the curing agent consists of the active compound itself and its normal oxidation products. Mixing of the curing agent with another compound to form a eutectic or modifying it, as by forming adducts or cyanoethylation products thereof, is considered adulteration.

The underlying reasons, as to why the procedure of this invention converts the disclosed, normally solid compounds to room temperature, stable liquids are not understood. The phenomenon of surfusion is, of course, not unknown in nature. Nevertheless, surfusion is not a characteristic of all materials and the behavior of substances, when subjected to super-cooling, varies widely.

As stated previously, the art has long endeavored to produce a stable, nonadulterated, liquid aromatic polyamine but has, heretofore, never done so.

The invention will be more fully understood by reference to the following examples which are merely intended to be illustrative of specific embodiments of the invention and are not intended to, nor should they be construed as, a delineation of the scope thereof.

EXAMPLE I

A clean, 50ml beaker containing 10 gms of m-phenylene diamine was placed in an oven and allowed to remain at a temperature of 110° C. for approximately 90 minutes. The m-phenylene diamine was completely melted at the end of this time. The oven was then turned off, the beaker and contents were then removed from the oven, allowed to cool, slowly, to room temperature (25° C.) and placed on a laboratory shelf. At the end of 7 months there was no evidence of crystallization, the m-phenylene diamine remaining completely liquid.

EXAMPLE II

To 8 grams of an epoxide polymer, such as illustrated above, was added, with stirring, 1.16 grams of m-phenylene diamine prepared as in Example I. The m-phenylene diamine and the epoxide resin blended easily to form a homogeneous, viscous mixture. The mixture was then placed in an oven at a temperature of about 70° to 100° C. for 2 hours, followed by postcuring for 4 hours at about 160° C. At the end of this time the mixture had polymerized to a hard, tough mass having a heat distortion temperature of 159° C.

EXAMPLE III

A mixture of m-phenylene diamine and epoxide resin was prepared, as in the prior art, by heating both curing agent and resin to a temperature of about 80° C.

A second mixture of m-phenylene diamine, as prepared by the method of this invention, and epoxide was prepared at room temperature.

The pot life of each of the mixtures were then compared utilizing a MOL-REZ Gel Time Meter. The comparison was conducted by placing a 100ml. sample of each of the mixtures in a suitable beaker and placing the beaker under the suspended 3g. lead weight of the meter. At intervals of one minute the lead weight was slowly lowered into the mixture and slowly withdrawn at a constant rate. The time, in minutes, was automatically recorded on the meter. That point at which the lead weight cannot be withdrawn from the initially liquid, but now gelled mixture, is taken as the gel point. The elapsed time, from initially mixing the curing agent and epoxide to gelation, is the pot life of the mixture.

The prior art mixture had a pot life of about 4 hours while the mixture prepared by the method of this invention had a pot life in excess of 9 hours.

Obviously many modifications and variations of the present invention are possible in the light of the above teachings. It is therefore to be understood, that within the scope of the appended claims, the invention may be practiced otherwise than as specifically described.

Having thus described the invention, what is claimed and desired to be secured by Letters Patent of the United States is:

1. A method of combining a curing agent with an epoxide resin consisting of:
    a. heating normally solid nonadulterated m-phenylene diamine to a temperature above its melting point.
    b. allowing said melted m-phenylene diamine to cool slowly to room temperature to form a stable supercooled liquid, and thereafter,
    c. admixing said supercooled liquid with said epoxide resin.

2. The method of claim 1 wherein said epoxide resin is the reaction product of epichlorohydrin with bis(4-hydroxyphenyl) dimethylmethane.

3. A method of curing an epoxide resin consisting of:
    a. heating normally solid nonadulterated m-phenylene diamine to a temperature above its melting point,
    b. allowing said melted m-phenylene diamine to cool slowly to room temperature to form a stable supercooled liquid,
    c. admixing said supercooled liquid with said epoxide resin, and thereafter,
    d. heating said admixture to a temperature sufficient to cure said epoxide resin.

4. The method of claim 3 wherein said epoxide resin is the reaction product of epichlorohydrin with bis (4-hydroxyphenyl) dimethylmethane.

* * * * *